United States Patent
Heynen et al.

(10) Patent No.: US 9,947,069 B2
(45) Date of Patent: Apr. 17, 2018

(54) PROVIDING VARIANTS OF DIGITAL ASSETS BASED ON DEVICE-SPECIFIC CAPABILITIES

(71) Applicant: Apple Inc., Cupertino, CA (US)

(72) Inventors: Patrick O. Heynen, Redwood City, CA (US); Vince DeMarco, San Jose, CA (US)

(73) Assignee: Apple Inc., Cupertino, CA (US)

( * ) Notice: Subject to any disclaimer, the term of this patent is extended or adjusted under 35 U.S.C. 154(b) by 168 days.

(21) Appl. No.: 15/179,831

(22) Filed: Jun. 10, 2016

(65) Prior Publication Data

US 2017/0358051 A1    Dec. 14, 2017

(51) Int. Cl.
*G06T 1/20*    (2006.01)
*G06F 9/445*   (2018.01)
*G06F 9/54*    (2006.01)

(52) U.S. Cl.
CPC ............... *G06T 1/20* (2013.01); *G06F 8/61* (2013.01); *G06F 9/54* (2013.01)

(58) Field of Classification Search
CPC .......... G06T 1/20; G06F 8/61; G09G 2340/02
USPC ........................................ 345/501, 503, 555
See application file for complete search history.

(56) References Cited

U.S. PATENT DOCUMENTS

| 7,966,428 | B2 | 6/2011 | Jalon |
| 8,219,653 | B1 | 7/2012 | Keagy et al. |
| 8,356,117 | B2 | 1/2013 | Jalon |
| 8,468,498 | B2 | 6/2013 | Lee et al. |
| 8,713,558 | B2 | 4/2014 | Vidal et al. |
| 8,863,077 | B2 | 10/2014 | Lee et al. |
| 9,009,696 | B2 | 4/2015 | Vidal et al. |
| 2006/0265489 | A1 | 11/2006 | Moore |
| 2008/0052704 | A1 | 2/2008 | Wysocki |
| 2009/0063624 | A1 | 3/2009 | Nordstrom et al. |
| 2010/0077475 | A1 | 3/2010 | Deschenes et al. |
| 2013/0141443 | A1 | 6/2013 | Schmit et al. |
| 2013/0165222 | A1 | 6/2013 | Wysocki |
| 2014/0115056 | A1 | 4/2014 | Makower et al. |
| 2014/0359606 | A1 | 12/2014 | Salameh et al. |
| 2014/0372998 | A1 | 12/2014 | Salameh et al. |
| 2015/0331870 | A1* | 11/2015 | Bystrom ........... G06F 17/30058 707/661 |

(Continued)

*Primary Examiner* — Jacinta M Crawford
(74) *Attorney, Agent, or Firm* — Womble Bond Dickinson (US) LLP

(57) ABSTRACT

Described is a system for providing variants of a digital asset based on specific device capabilities of target devices. A developer may compress a digital asset that is part of a universal application to be installed on a set of target devices by selecting from a set of intent-based compression options. The compression options may include hardware-accelerated compression formats that utilize a graphics processing unit (GPU) during rendering. Despite the compression option selected, the application package includes a variant of the digital asset renderable on each type of target device including devices without a GPU. This allows a developer to freely choose any option without the concern of whether the option is compatible or supported by each type of device. A distribution server may then map attributes of a specific target to particular feature classes, and accordingly, distribute an appropriate variant of the digital asset to the target device.

25 Claims, 11 Drawing Sheets

(56) References Cited

U.S. PATENT DOCUMENTS

2016/0070549 A1    3/2016  Hall
2016/0085533 A1    3/2016  Venkata et al.

* cited by examiner

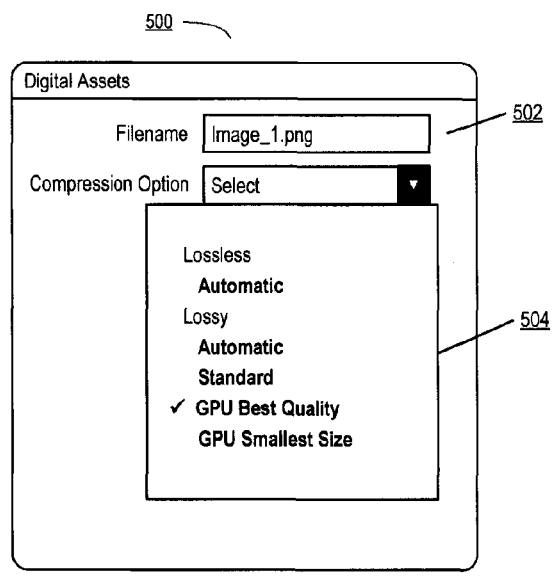
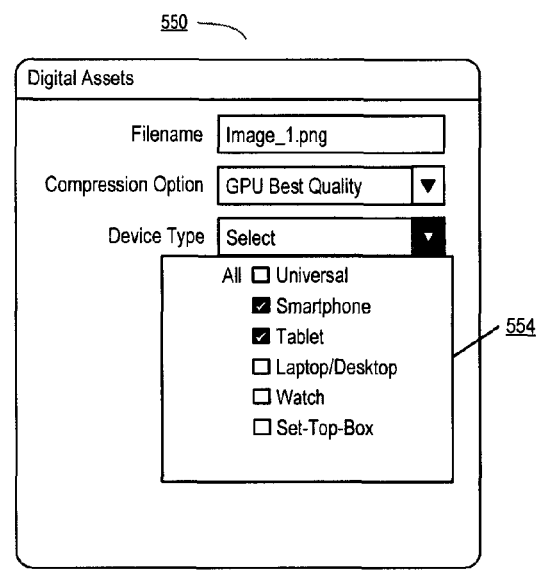
FIG. 5
FIG. 6

PROVIDING VARIANTS OF DIGITAL ASSETS BASED ON DEVICE-SPECIFIC CAPABILITIES

TECHNICAL FIELD

This disclosure relates generally to the field of application packaging. More specifically, this disclosure relates to building and distributing application components with variants of digital assets.

BACKGROUND

Retail software applications are typically developed or built to run across a range of devices. Accordingly, in order to lessen the development burden, such an application is often developed and packaged as a "universal version" that may be installed on a range of different types of devices. To ensure compatibility with every type of device, however, the application package may include a version of a component for each of the different types of devices. For example, various versions of components that are compatible with various hardware capabilities are often included in the application package. As the size of the range of devices increases, however, the size of the application packages may directly increase as well. Accordingly, such application packages may become burdensomely large and inefficient to transfer or install on a device.

In addition, certain components may not be compatible with various combinations of hardware and software amongst the range of devices. Moreover, recognition of compatibility issues may substantially increase the development resources, and even when considered, an application may be developed to adhere to compatibility dynamics only at the time of development. Thus, it is often the case that these applications are packaged to a lower capability set in order to maintain compatibility dynamics and ease the burden on developers to manage the hardware variances between devices. Of course, this in turn diminishes the ability for an application to leverage the full hardware capabilities of a device. Accordingly, attempts at easing the developer's burden by creating universal applications often results in application packages that are often inefficient and do not always maximize the performance potential of a particular device.

SUMMARY

In an embodiment, described is a mechanism for maintaining the use of universal application packages to leverage specialized processing capabilities of target devices while still easing the burden on developers for managing capability issues. Embodiments may be part of an application development and distribution system that uses a universal application package and then "thins" (e.g. reduces the size) of the package to assemble an installation package variant to be distributed and installed on a specific device. An example of an application packaging system that may be employed by various embodiments of the present disclosure can be found in U.S. patent application Ser. No. 14/732,610, filed Jun. 5, 2015, and titled CAPABILITY ATTRIBUTES BASED APPLICATION PACKAGING, which is incorporated by reference.

During development, when a developer includes digital assets such as images as part of a universal application package, these assets may leverage image processing capabilities of a target device. In one example, digital assets may be compressed using various compression formats including formats that utilize specialized hardware circuitry of a target device for image processing. Such hardware-accelerated compression formats, however, often rely on a certain class of GPUs or software components (e.g. operating system (OS), or application programming interface (API)), which are often not uniform throughout a suite of devices. Accordingly, to address such issues, some embodiments describe efficiently managing various compatibility combinations of these components while still easing the development burden on developers by, for example, abstracting such compatibility determinations away from a development interface, and instead, providing "intent-based" options to the developer.

In another example, digital assets may leverage color display capabilities of a target device. For instance, certain target devices may have wide (or deep) color gamut display capabilities. In order to manage device capabilities, embodiments may reference attributes that describe characteristics of a type of target device. In addition, these attributes may be mapped (or classified) according to a set of feature classes to determine capabilities of a particular target device. Moreover, embodiments may intelligently manage the interoperability of the multitude of potential hardware and software combinations throughout a suite of devices.

In an embodiment according to a first aspect, a system (or device) may provide a set of device agnostic digital asset formatting options. For example, the system may provide a set of compression options. In another example, the system may provide a set of color gamut display options. Based on the selected formatting option, the system may determine the compatibility of a corresponding format for target devices within a suite of devices. For example, the system may select appropriate compression formats including hardware-accelerated and non-hardware accelerated formats based on capabilities of the target devices. In another example, the system may select an appropriate color gamut including a wide color gamut or a standard color gamut depending on the display capabilities of the target devices. In addition, there may be instances where the formatting option selected by a developer may not be compatible with a target device. In such situations, a backstop or fallback asset may be provided. In another example, a developer may select a formatting option that a target device does not currently support, but may support in the future. In such situations, an asset may be provided and remain dormant until a component of the target device (e.g. software component) is updated to allow for rendering of the asset.

In an embodiment according to a second aspect, a server may receive a component of an application to be installed on a set of different types of devices. The component may include a set of variants of a digital asset (e.g. image) each of which are compressed with a different compression format. Each of the variants may be associated with a set of feature classes, and in response to receiving a request to install the application on a target device, the server may map device trait attributes of the target device to the set of feature classes. Accordingly, based on the mapping, the server may select an appropriate variant of the compressed digital asset to include in an installation package for the target device.

BRIEF DESCRIPTION OF THE DRAWINGS

Embodiments of the disclosure are illustrated by way of example, and not by way of limitation, in the figures of the accompanying drawings in which like reference numerals refer to similar elements.

FIG. 5 is an example interface for selecting a compression option for a digital asset according to an embodiment of the disclosure.

FIG. 6 is an example interface for selecting target device types for a digital asset according to an embodiment of the disclosure.

DETAILED DESCRIPTION

Various embodiments and aspects will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments.

Reference in the specification to "one embodiment" or "an embodiment" means that a particular feature, structure, or characteristic described in conjunction with the embodiment can be included in at least one embodiment. The appearances of the phrase "in one embodiment" in various places in the specification do not necessarily all refer to the same embodiment. The processes depicted in the figures that follow are performed by processing logic that comprises hardware (e.g. circuitry, dedicated logic, etc.), software, or a combination of both. Although the processes are described below in terms of some sequential operations, it should be appreciated that some of the operations described may be performed in a different order. Moreover, some operations may be performed in parallel rather than sequentially.

The disclosure relates to developing and distributing application components with variants of digital assets based on graphics processing capabilities of a target device. Such development and distribution may occur within a system.

Figure 1:
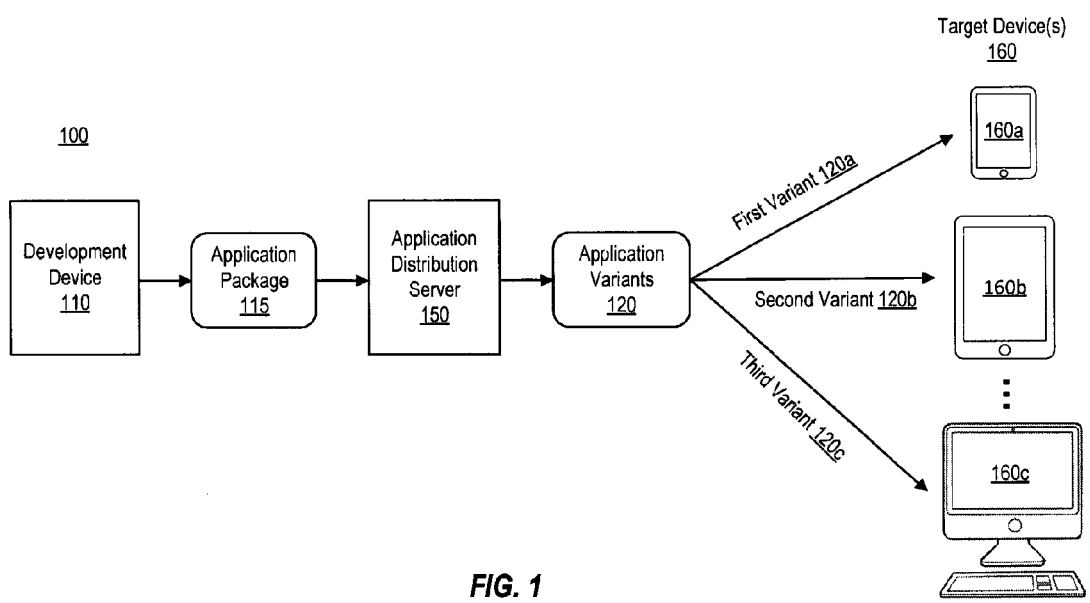
FIG. 1 is a block diagram illustrating an example system overview according an embodiment of the disclosure.

FIG. 1 is a block diagram illustrating an example system overview according an embodiment of the disclosure. As shown, the system 100 may include a development device 110, application distribution server 150, and one or more target devices 160, all of which may be coupled via a network. The network may be any suitable type of wired or wireless network such as a local area network (LAN), a wide area network (WAN), or combination thereof. A developer (e.g. a user) may develop an application package 115 with, for example, the development device 110. An application package 115 may include components for installing an application on a device. For example, the components may include data in the form of executables (or intermediate code), assets (or resources), and other forms of data required for the application. The application package 115 may be submitted from development device 110 to application distribution server 150 via the network. The application distribution server 150 (or Application Store, or "App Store") may publish or otherwise make available the application package 115 for a user to download or install, via the network, to one or more target devices 160. It should be noted that the application distribution server 150 may be any kind of server or a cluster of servers and may include a cloud-based server, application server, backend server, or combination thereof.

When the application is to be installed on one of the target devices 160, the application distribution server 150 may create an application variant 120 customized for the particular target device 160. For example, the application variant 120 may include a particular set of components, including digital assets, for the target device 160. For instance, as further described herein, variants 120 may include digital assets in formats based on the image rendering abilities of a target device 160. The target device 160 may be one of a set of different types of devices. As referred to herein, a type of device relates to the category of device which may include, for example, a smartphone, tablet, laptop, desktop, smartwatch, VR headset, set-top-box, or any other category of devices. In addition, types of devices within a suite of devices may also be grouped together based on various factors (e.g. screen resolution, CPU, OS, etc.). Accordingly, as shown in this example, a first variant 120a may be provided to target device 160a (e.g. smartphone type of device), a second variant 120b may be provided to target device 160b (e.g. tablet type of device), and a third variant 120c may be provided to target device 160c (e.g. desktop computer type of device). Accordingly, the application distribution server 150 provides a "thinned" or customized application package variant (or installation package) for each type of target device 160.

Figure 2:
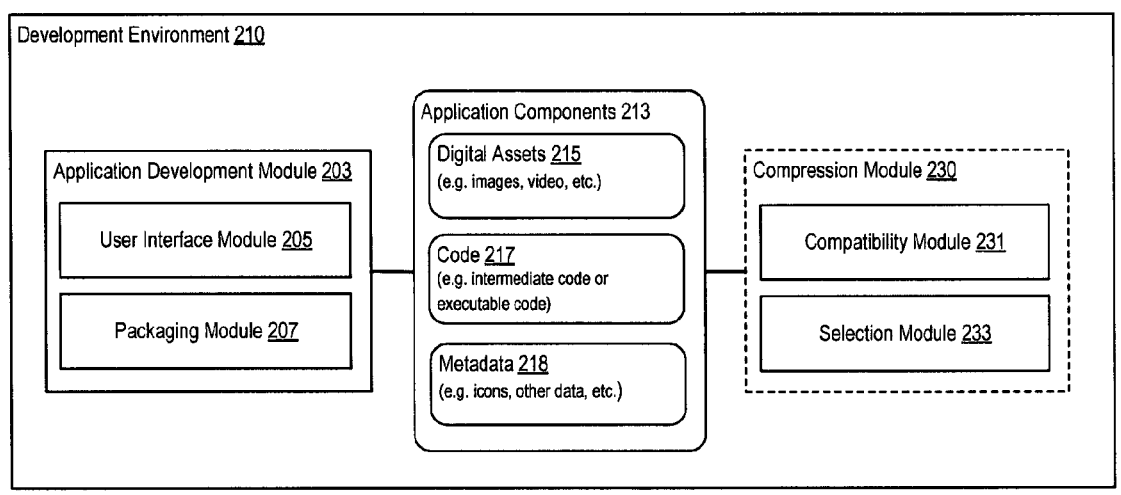
FIG. 2 is a block diagram illustrating an example development environment for creating compressed digital assets according to an embodiment of the disclosure.

FIG. 2 is a block diagram illustrating an example development environment for creating compressed digital assets according to an embodiment of the disclosure. In one embodiment, development device 110 may include some or all of the components of system 200 as part of a development environment 210, which may include an application development module 203, application components 213, and compression module 230. The application development module 203 may include a user interface module 205, compression selection module 206, and packaging module 207. The user interface module 205 may provide a development interface allowing a developer to select components to include in an application package. For example, the developer may include certain digital assets to be included as part of an application. When including digital assets as part of an application, the developer may compress the digital assets by selecting one of various compression types. For example, the user interface module 205 may include a list of various compression types (as further discussed herein) or formatting options that may be selected irrespective of the intended target device. Accordingly, the developer does not have to worry about compatibility issues during the development phase.

Application development module 203 may package application components 213 generated for an application with a packaging module 207. For example, application components 213 may include multiple components such as digital assets 215 (e.g. images, video, shaders, textures, etc.) to be accessed during runtime of the application, code 217 (e.g. executable or intermediate code) carrying different versions of machine code for different hardware of devices (e.g. processor, chip sets, etc.), and other forms of data such as metadata 218 (e.g. icons).

When a developer selects a compressed digital asset to be included in the application, a compression module 230 may compress the digital asset based on the selected compression type. The compression module 230 may include a compatibility module 231 to determine which compression formats are compatible for the types of target devices. For example, as further described herein, the compatibility may be determined based on device trait attributes of the target devices. Based on a compatibility determination of compression formats, a selection module 233 may select a compression format, and in some instances as further described herein, an additional backstop compression format.

Various compression formats or codecs may be employed. For example, various lossless or lossy data compression formats, as well hardware-accelerated or non-hardware-accelerated compression formats. For example, in one embodiment, compression using the Adaptive Scalable Texture Compression (ASTC) specification may be employed. For example, ASTC specification (developed by ARM®) may be used as an extension to various versions of the Open GL (or Open GL ES) series of graphics APIs, and variants thereof. In addition, other formats such as High Efficiency Image File Format (HEIF), High Efficiency Video Coding (HEVC, or H.265), or any other suitable formats including newly adopted or developed formats may also be used.

Variants of Lempel-Ziv-Welch (LZW) algorithms may also be used including the LZ77 and LZ78 (also known as LZ1 and LZ2 respectively) families and variations such as LZSS, LZMA, as well as any other variants. Additional compression algorithms may also be used such as, for example, DEFLATE, as well as proprietary techniques such as LZFSE, or any other suitable technique.

The compression formats may also include hardware-accelerated compression formats. Generally, hardware-accelerated compression formats relate to formats that leverage specialized circuitry within the device for processing. As referred to herein, and unless otherwise stated, specialized circuitry relates to circuitry that is provided in addition to a general purpose processor (e.g. CPU) of a device, although these components may perform processing in conjunction with each other or share resources. For example, the specialized circuitry may be in the form of a graphics processing unit (GPU), but other forms of specialized circuitry (e.g. ASICs) are also contemplated. Examples of hardware-accelerated compression formats may include ASTC (as described above), Ericsson Texture Compression (ETC), Ericsson Texture Compression 2 (ETC2), PowerVR Texture Compression (PVRTC), S3 Texture Compression (S3TC), which is also known as DirectX Texture Compression (DXTC), ATC, as well as other formats.

It should be noted that in addition to compression, the disclosure may equally apply to various compression or encoding techniques for multimedia including images, audio, video, or combination thereof. For example, the encoding techniques may include any video compression standards (e.g. MPEG standard formats). As described herein, the system may efficiently incorporate any number of formats including newly adopted or developed formats. For example, when a new format is introduced into the system as a possible variant, the system may update mapping tables or re-process assets for various target devices as necessary.

In addition to compression formats, various other digital asset formatting options may also be available to the developer. For example, a developer may also select an asset be displayable according to a particular color gamut. As referred to herein, a color gamut generally refers to the subset of colors which can be accurately represented by a target device. The color gamut may refer to any suitable standard such as sRGB, scRGB, Adobe RGB, and others including variations in bit sizes.

It should be noted that although the compression module 230 is shown within a development environment 210, the compression module 230 may reside on the development device 110, or another device such as an intermediary device, or server device.

Figure 3:
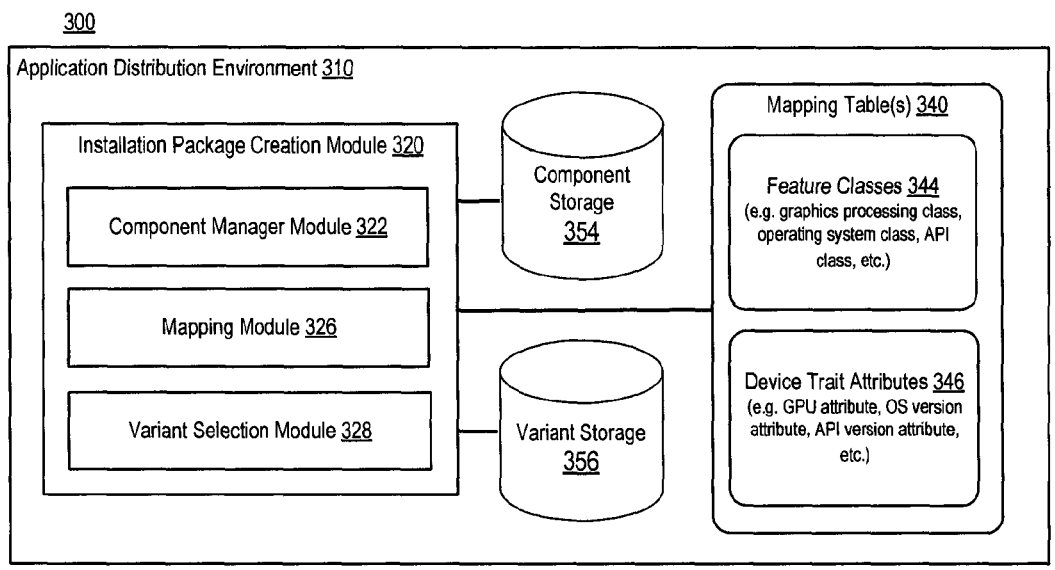
FIG. 3 is a block diagram illustrating an example application distribution environment for selecting an appropriate variant of a digital asset for a target device according to an embodiment of the disclosure.

FIG. 3 is a block diagram illustrating an example application distribution environment for selecting an appropriate variant of a digital asset for a target device according to an embodiment of the disclosure. In one embodiment, application distribution server 150 may include some or all of the components of system 300 as part of an application distribution environment 310. The application distribution environment 310 may include an installation package creation module 320, component storage 354, variant storage 356, and some form of data structure for organization feature classes 344 and device trait attributes 346 such as one or more mapping tables 340. For example, installation package creation module 320 may include a component manager module 322, a mapping module 326, and a variant selection module 328. The component manager module 322 may perform management functions related to the components of an application. For example, the component manager module 322 may receive components, including compressed digital assets, from the development environment and store them in the component storage 354. In addition, the component manager module 322 may transmit components, as part of an installation package, to a particular target device. When creating an installation package, the component manager module 322 may retrieve data (e.g. components or variants) from the component storage 354 and variant storage 356. A variant storage 356 may be included as a separate storage (as shown), but may also be part of the component storage 354 depending on a data management configuration. For example, the component storage 354 may store components that are shared amongst target devices (e.g. executable files), while the variant storage 356 (which may be a remote storage) stores variants that are specific to a target device (e.g. compressed digital assets).

In order to determine relevant information relating to target devices, device trait attributes 346 may be stored and associated with a target device. The device trait attributes 346 may characterize properties of a device. For example, device trait attributes 346 may represent attribute values for a collection of attributes describing hardware and/or software capabilities of a device or potential future device (e.g. a new smartphone release). These attributes may be associated with a set of values or a range of values, such as numerical values, character names, or other applicable values. For example, device trait attributes 346 may relate to device idioms (e.g. model names), hardware components and capabilities such as processors, architectures, display capabilities such as color gamut and screen resolutions, special processors (e.g. graphics processing unit, health processor, motion processor or other applicable special-purpose processors), memory (e.g. RAM, storage size), network protocols supported (e.g. Wi-Fi, USB, automobile connections, etc.), installed software (e.g. operating systems, APIs, add-ons, extensions, etc.), firmware versions, battery capacity, GPS (global position system) or other location capabilities, specific sensor capabilities (e.g. gyroscope sensor, heart rate sensor, or other applicable sensors), sets of feature capabilities, user accounts, or any other applicable information. In addition, device trait attributes 346 may have dependency relationships among each other or may be utilized independently. Applicable attributes may be extendable or configurable to accommodate the continuous evolution of target devices and comparable relationships may also be defined among the attribute values to allow mapping or matching comparisons, similarity comparisons, or other applicable comparisons.

The feature classes 344 may be used to manage, organize, and classify the device trait attributes 346. The feature classes 344 may group together certain device trait attributes to provide information on capabilities or compatibility between attributes of a device. For example, the feature classes 344 may include classes related to image rendering/processing or display capabilities of a device such as a CPU, GPU, memory (e.g. RAM), screen resolution, color gamut, display type, as well as software (e.g. libraries, APIs, etc.), firmware, or other classes.

Classes may be structured in any number of ways (e.g. mapping tables, lists, etc.) and may include a hierarchy. For example, the hierarchy may provide an indication of backward or forward compatibility of a group of attributes or features. For instance, feature classes may include a numerical hierarchy in which higher classes are backwards compatible with one or more lower classes. For instance, a class 5 GPU may be capable performing functions of a class 4 GPU, but not vice versa. Of course, other formats, indicators, fields, etc. may also be used (e.g. within a mapping table) to indicate if certain features are backwards or forwards compatible. In addition, the hierarchy of classes may define an order of fallback (or backstop) classes or default classes. For example, classes may be associated with GPUs capable of hardware-accelerated decompression, and if a device does not such a feature, a default (or lower) class may be determined. For example, the default class may correspond to a class that do not support hardware-accelerated decompression (e.g. devices with no GPU, or legacy GPU, or incompatible software components, etc.).

In some embodiments, a mapping module 326 may map the device trait attributes 346 to corresponding feature classes 344 to determine capabilities of a device. Capabilities may be determined based on single mappings (or matching) as well as based on combinations of hardware components and software components that may be interrelated (e.g. combinations of GPU, OS, API attributes). For instance, a GPU may be require certain APIs to render particular compressed images. In addition, compatibilities may also be determined between feature classes. For example, a graphics processing feature class (e.g. GPU supporting hardware-accelerated decompression) may not be compatible with certain software component classes such as an operating system class or API class.

A variant selection module 328 may select an appropriate variant of a component (e.g. variant of a compressed image). In some embodiments, the selection may be based on a mapping feature classes (e.g. mapping attributes to feature classes), and in other embodiments, the selection may be based on, for example, device trait attributes 346 alone.

Figure 4:
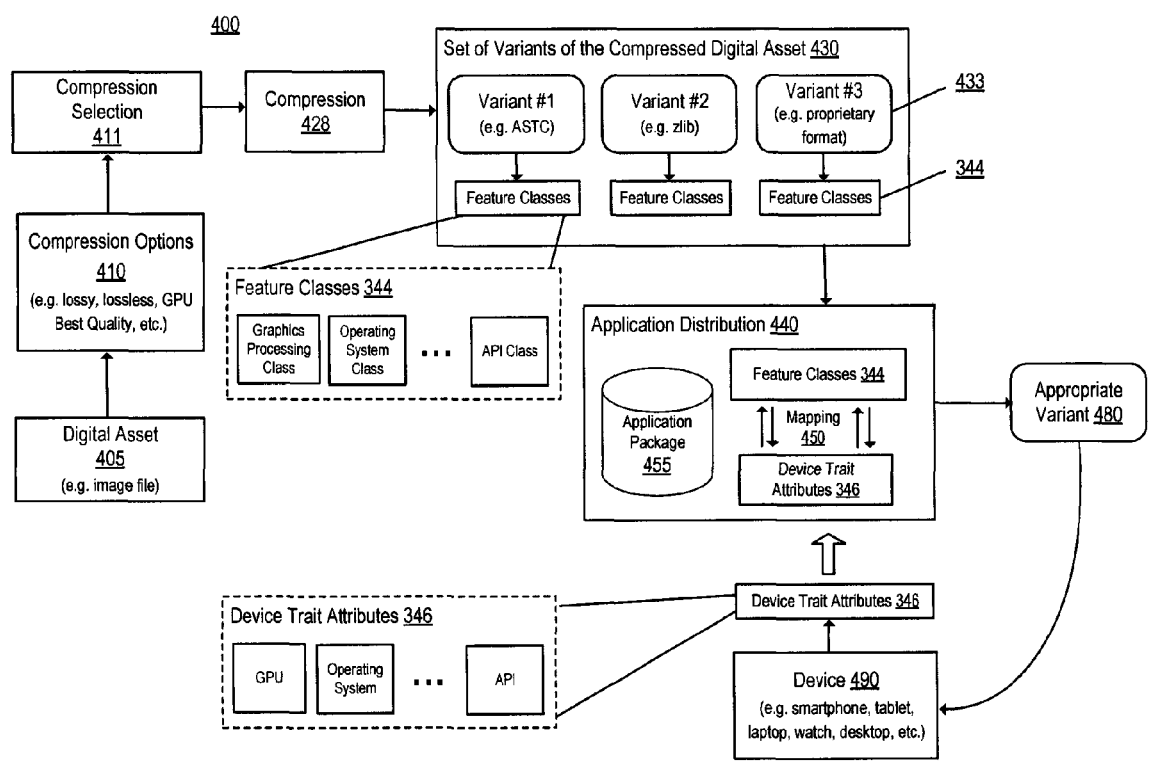
FIG. 4 is a flow diagram illustrating an example process of a digital asset being compressed into variants and an appropriate variant being selected and distributed to a target device according to an embodiment of the disclosure.

FIG. 4 is a flow diagram illustrating an example process of a digital asset being compressed into variants and an appropriate variant being selected and distributed to a target device according to an embodiment of the disclosure. Portions of the process 400 may be performed by a system (or device, e.g. development device 110, or application distribution server 150). The process 400 may start with a digital asset 405. In this example, the digital asset 405 is shown as an image file, but other types of digital assets are also contemplated such as video files, audio files, etc. As referred to herein, an image file is defined broadly to include any type of image file format including, for example, bitmaps, or variations (e.g. GIF, JPEG, TIFF, and PNG), etc., that may be used in any number of applications including 2D and 3D image or graphics processing. When the digital asset 405 is to be included in an application, a developer, for example, may choose to compress the digital asset 405. Accordingly, a developer may be provided with a set of compression options 410. In an embodiment, the compression options may be described (e.g. listed) in a device agnostic manner. For example, the compression options 410 may be listed in general terms without reference to the devices that may or may not support a particular compression option. For example, the options may include intent-based options instead of capability-based options. This allows a developer to freely choose any option without the concern of whether the option is compatible or supported by each type of device. Accordingly, compatibility issues are instead handled, for example, at the time of compiling/compression by the system. In one embodiment, the compression options 410 may be provided as part of a user interface, for example, within a development environment.

FIG. 5 is an example interface for selecting a compression option for a digital asset according to an embodiment of the disclosure. Interface 500 shows an example set of compression options 504 for a digital asset 502 (e.g. Image_1.png). As shown, the set of compression options 504 may include lossless and lossy compression options. In this example, an automatic lossless compression option is available. For example, when this option is selected a suitable lossless compression format for each type of device will be determined automatically. Similarly, when an automatic lossy compression option is selected, a suitable lossy compression format will be selected automatically. The automatic selection may be predefined or may be established based on a set of criteria. The set of criteria may ensure the compression conforms to a particular standard (e.g. image quality, performance, size, etc.). For example, an automatic compression option may be may defined based on providing an adequate degree of compression while still maintaining an image quality standard throughout a suit of device types (e.g. devices within an ecosystem). As shown, additional compression options may also be available such as a "standard," basic, default, or a like type of compression option. Similarly, a "standard" compression option may be predefined or may be established based on a set of criteria as described above.

In addition, certain hardware-accelerated options may also be provided. In this example, the "GPU" prefix indicates that "GPU Best Quality" and "GPU Smallest Size" employ a hardware-accelerated compression technique. Although developers may generally know which types of devices are capable of hardware-accelerated decompression, a developer need not be burdened with such issues, as further discussed herein, an alternative (or additional, or backstop, or fallback) compression format may be included in an application variant in the event that not all types of devices support hardware-accelerated compression.

It should be noted that the compression options in FIG. 5 are examples on generic naming conventions, but other naming conventions with similar or different results are also contemplated. For example, the term "highest," "best," "max" compression may also be used, but would be considered equivalent to "smallest size" as each of these refer to the intent of maximizing the amount of compression. Similarly, "highest" quality, for example, would be synonymous with "best" quality and generally refer to the intent of maintaining a highest degree of image quality. In addition, although compression options 410 are shown as being selected via an interface, other forms of selection are also complemented such, for example, through a command line instruction or through a programming protocol (e.g. via an API).

Returning to FIG. 4, once a compression option is selected, the system may perform a compression selection 411 to select one or more suitable compression formats. When selecting the compression format, the compression selection 411 may consider the types of devices in the set of target devices. In an embodiment, the set of the different types of devices may be predetermined or known (e.g. based on a suite of devices offered by a provider) at the time of development. For example, a developer may not be required to select specific device types (e.g. within an interface), and accordingly, the compression selection may automatically select device types (e.g. all device types within the suites of devices). In another embodiment, the developer may select specific device types as intended target devices for the application. For example, the compression options 410 may be provided as part of a user interface within a development environment.

FIG. 6 is an example interface for selecting target device types for a digital asset according to an embodiment of the disclosure. In one embodiment, the additional interface elements shown in this example may be included in addition to the elements shown, for example, in FIG. 5. Interface 550 shows an example of a set of device types 554 that may be selected as target device types by a developer. As shown, the interface 550 may include an option to select specific device types, as well as an option to select all device types (e.g. "universal" or similar option). The set of device types 554 included in the interface may correspond to groups of devices available within a suite of devices and may be categorized (or grouped) based on capabilities. For example, an application may be specifically developed for portable devices rather than a desktop or laptop computer. In such a situation, as shown in this example, a developer may select a smartphone and tablet as the target device types for the application.

As described, the developer may be free to choose any device type, and as discussed further herein, appropriate compression formats will be selected automatically by the system. In addition, the interface may disable the selection of certain device types in response to a selected compression option (or certain compression options may be disabled in response to a selected device type). Regardless of the specific implementation of the interface, the system, in one embodiment, relieves the developer from determining which compression options are compatible with certain device types.

It should be noted that more options may also be provided within the interface. For example, any of the attributes or classes described herein may be selectable within the interface. For example, specific memory, color gamut, display screen resolution, etc., may also be available to be selected as options by a developer (including options to include "all" types). In one embodiment, the interface may provide a set of options for the type of color gamut. For example, the color gamut options may include standard, wide, etc. as well as options that may relate to one or more color gamut standards. For example, sRGB may correspond to a "standard" color gamut option and an Adobe RGB may correspond to a "wide" or "deep" color gamut option. In addition, a target device may be capable of displaying colors of more than one color gamut (e.g. dual color gamut capability), and thus, single or dual color gamut options may also be specified. It is also contemplated that a new types of devices (e.g. a device added to a suite of devices or ecosystem of a provider) may also be incorporated into the system by simply adding the new device into, for example, mapping tables (or updating feature classes).

Returning to FIG. 4, the compression selection 411 may consider the types of devices in the set of target devices in order to ensure that the digital asset is compressed in a format that is renderable in some form by all of the device types. Accordingly, the selection process may include a set of decisions, for example, as shown in FIG. 7.

Figure 7:
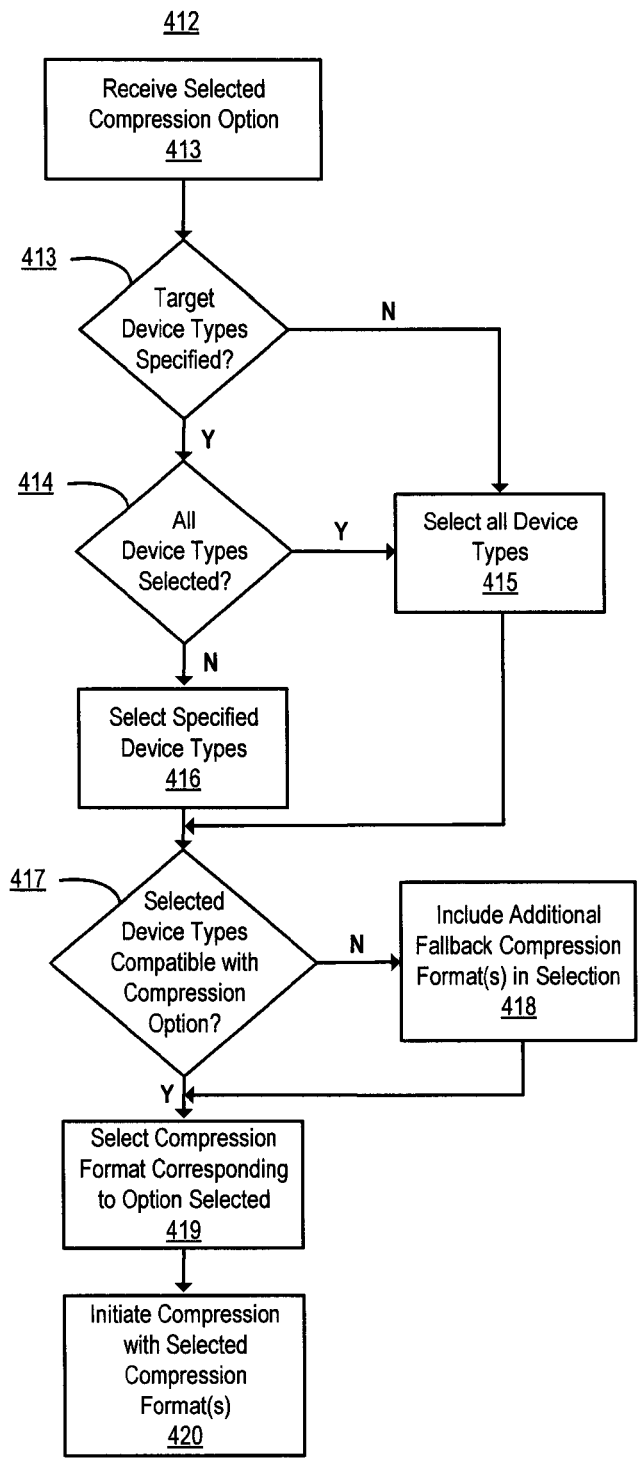
FIG. 7 is an example flowchart for selecting a compression format for a digital asset according to an embodiment of the disclosure.

FIG. 7 is an example flowchart for selecting a compression format for a digital asset according to an embodiment of the disclosure. The process 412, may begin by the system receiving a selected compression option in 413 (e.g. compression selection as described in 410). As described, target device types may be specified in 413. However, if no target device types are specified, or if target device types are specified in 413, but the selection includes all device types in 414, the system may select all device types in 415. Alternatively, if all device types are not selected in 414 (e.g. specific device types are selected as shown, for example, in FIG. 6), the system may proceed with the specified device types in 416. In 417, the system determines whether the selected device types are compatible with the selected compression option (e.g. compression option of 413). In 418, if the selected compression option is not compatible with the selected device types, the system may include one or more additional fallback compression formats in the selection. Again, this ensures that the digital asset is compressed in a format that is renderable in some form by all of the device types. For example, if a developer selects a compression option that is not supported by every device type (e.g. an option corresponding to a hardware-accelerated compression format), an alternative compression format may be additionally selected (e.g. a non-hardware accelerated option).

If the selected device type is in fact compatible with the selected compression option in 417, the system, in 419, may continue and select only the compression format corresponding to the option selected in 419. Accordingly, an in embodiment, the system may initiate compression in 420 using only the compression format corresponding to the option selected, or the compression format corresponding to the option selected and the one or more fallback compression formats.

Process 412 may also be performed to select other types of asset formats. In one embodiment, process 412 may be performed to select a color gamut for a digital asset. For example, in 417, the system may determine whether the selected device types are compatible with the selected color gamut. In 418, if the selected color gamut option is not compatible with the selected device types, the system may include one or more additional fallback color gamut types in the selection. For example, if a developer selects a color gamut type that is not supported by every device type (e.g. a wide color gamut), an alternative (or fallback) color gamut type may be additionally selected such as a standard color gamut (e.g. an 8-bit sRBG color gamut).

In some embodiments, when determining which compression format (or color gamut) to select, the system may refer to a list of device trait attributes (e.g. device trait attributes 345) of the set of target devices. For example, a mapping similar to mapping 450, as further described herein, may occur to select an asset format. In such an instance, for example, the device trait attributes may be mapped to feature classes. In another embodiment, the asset formats may be mapped directly to device trait attributes, or determined via some other form. For example, in an embodiment, an alternative compression format (e.g. a legacy compression format) may be included in response to another form of criteria, or may be included by default whenever a newly adopted or more recent compression format is selected.

Returning once again to FIG. 4, once a compression format is selected, a compression 428 of the digital asset may be performed. The compression 428 may compress the digital asset 405 based on the formats selected in the compression selection 411 to produce a set of variants of the compressed digital asset 430. Each of the variants 433 may be compressed with a different compression format. For instance, as shown in this example, the compressions formats may include a hardware-accelerated format (e.g. ASTC), a non-hardware-accelerated format (e.g. zlib), and a proprietary format, which may or may not be a hardware-accelerated format at the time of development. As discussed above, one or more of these compressions format may act as a fallback or backstop variant (e.g. zlib) for a device that do not support, for example, ASTC.

In an embodiment, each of the variants may be associated with feature classes 344. The feature classes 344 may be used to manage, organize, and distribute the variants 433 to the appropriate devices. For example, the feature classes 344 may include classes related to image rendering/processing or display capabilities of a device. Accordingly, the feature classes 344 may indicate the compatibility between a particular compression format and a device. For example, as shown in this example, the feature classes 344 may include a graphics processing class, software component classes (e.g. operating system class and API class), color gamut display class, and any other classes. The graphics processing class may indicate whether a hardware component such as a class of GPUs support particular compression techniques such as hardware-accelerated compression (or decompression). For instance, the graphics processing class may indicate whether the GPU of the device supports ASTC, or other compression format.

The operating system class may indicate which operating systems or versions support the compression format of the corresponding variant. For example, with a compression format that utilizes hardware acceleration, the operating system may require certain protocols or management of resources (e.g. memory allocation) to support such a compression format. For example, a class of operating systems may not currently support a hardware-accelerated compression format even in instances where the device has hardware capabilities (e.g. a specialized GPU) that support hardware-accelerated decompression. The operating system feature class (or in conjunction with another class) may also indicate additional information such as whether the operating system version installed on the device may provide future support (e.g. with a version upgrade), partial support, no planned future support, or any other relevant information.

Similarly, the API class may indicate which APIs or API versions support the compression format of the corresponding variant. For example, with a compression format that utilizes hardware acceleration, a particular API may need to be installed on the device, or a certain version, or certain libraries may be required (e.g. an extension pack). For example, a hardware-accelerated compression format may require an appropriate API is installed on the target device for rendering 2D or 3D graphics.

As referred to herein, and unless otherwise stated, an application programming interfaces (API) is defined broadly to include any set, or packages, of frameworks, protocols, routines, interfaces, libraries, data structures, object classes, etc. that may be used for interacting with software or hardware components of a device. For example, in some embodiments, an API may relate to rendering 2D and 3D graphics based on, for example, Open GL, Open GL ES, Vulkan, Metal, Direct 3D, Mantle, Renderman, or any other API. APIs may also include any other current and future developed APIs from various standards group including, for example, the Khronos Group.

Once a set of variants of the compressed digital asset 430 is created, they may be stored as part of an application package 455 and ready to be part of an application distribution 440, for example, by an application distribution server 150. For example, when a device 490 (e.g. target device) requests to install an application, the application distribution server 150 may perform a mapping 450 between device trait attributes 346 and the feature classes 344 to select an appropriate variant 480. When retrieving or determining the device trait attributes 346, the attributes may be provided in some form of structured format (e.g. a file) that is provided to, for example, the application distribution server 150. In another example, a device identifier may be provided and associated attributes may be retrieved form a source other than the device. In yet another example, the attributes may be directly associated with compression formats, or compression formats may be directly associated with the device (e.g. identifier of the type of device, or an identifier of the specific device). Accordingly, embodiments may determine a suitable compression format (or variant) without the use of classes or a predefined structure of trait attributes.

In some embodiments, the device 490 may include firmware built in (or burned in) with device trait attributes 346 (e.g. as hardware metadata) for publishing or describing device capabilities. As a result, the application distribution server 150 may allow application variants to be generated or adapted without actual knowledge (e.g. lookup rules) of mappings between devices and device capabilities. Accordingly, a capability change on a device 490 can induce the application distribution server 150 to automatically generate an application variant adapted to one or more updated device traits attributes 346 stored in the device 490. Accordingly, embedding the trait attributes 346 (e.g. true and appropriate capability features) in the firmware of the device 490 may simplify application development efforts. For example, resource lookup APIs can be built without needing the developer (or other system software components) to supply the correct lookup traits, which can be readily available (e.g. retrievable) from embedded information of the device 490.

Once a mapping 450 is performed, the appropriate variant 480 may be provided to the device 480. For example, the appropriate variant 480 of a compressed digital asset may be provided as part of an installation package in response to a request the install the application, or may be provided as part of an upgrade or update process.

Figure 8:
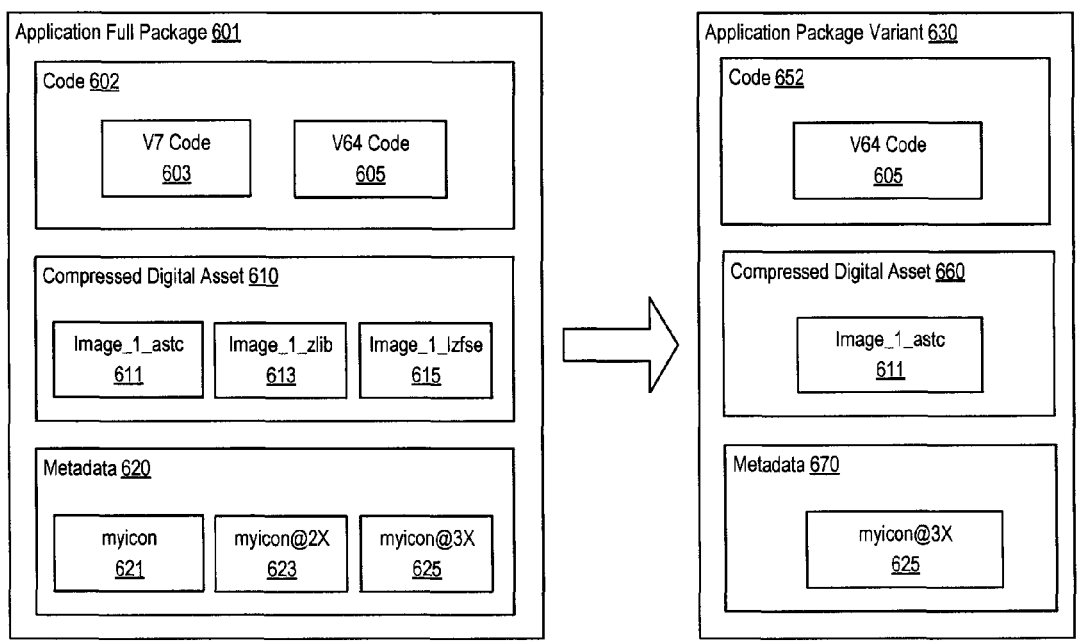
FIG. 8 is a block diagram illustrating an example application package variant with an appropriate digital asset variant for a target device according to an embodiment of the disclosure.

FIG. 8 is a block diagram illustrating an example application package variant with an appropriate digital asset variant for a target device according to an embodiment of the disclosure. The application full package 601 may include various components such as code 602, a compressed digital asset 610, and other components such as, for example, metadata 620. The code 403 may include different versions of executable code for the application. For example, V7 code 603 and V64 code 605 may be compiled from a common source code for the application to target a V7 processor based device and a V64 processor based device respectively. The compressed digital asset 610 may include different variants based on various compression formats. For example, as shown, the compressed digital asset 610 may include three variants of a compressed image (e.g. image_1) based on ASTC, ZLIB, and LZFSE compression formats. Other components may be included as well, such as a metadata 620 component. As shown, the metadata may include various types of data such as variants of an icon in three different sizes (e.g. myicon 621, myicon@2× 623, and myicon@3× 625). For example, the three different sizes may correspond to different screen resolutions or color gamut display capabilities of target devices.

The application package variant 630 represents a "thinned" package or an installation package of components for installing the application on a specific target device. For example, an appropriate variant for each component may be selected based on a mapping. For instance, code 652 may include V64 code 605 which was mapped to a 64-bit CPU processor class based on a device trait attribute indicating the device possesses a 64-bit processor. Similarly, metadata 670 may include myicon@3× 625 which was mapped to a large icon class based on a device trait attribute indicating the device includes a high-resolution screen. With respect to the compressed digital asset 660, as shown in this example, the application package 630 may include an image (Image_1_astc) compressed according to an ASTC compression format which was mapped to a hardware-accelerated capable graphics processing class based on a device trait attribute of the device indicating the device includes a specialized GPU.

Figure 9:
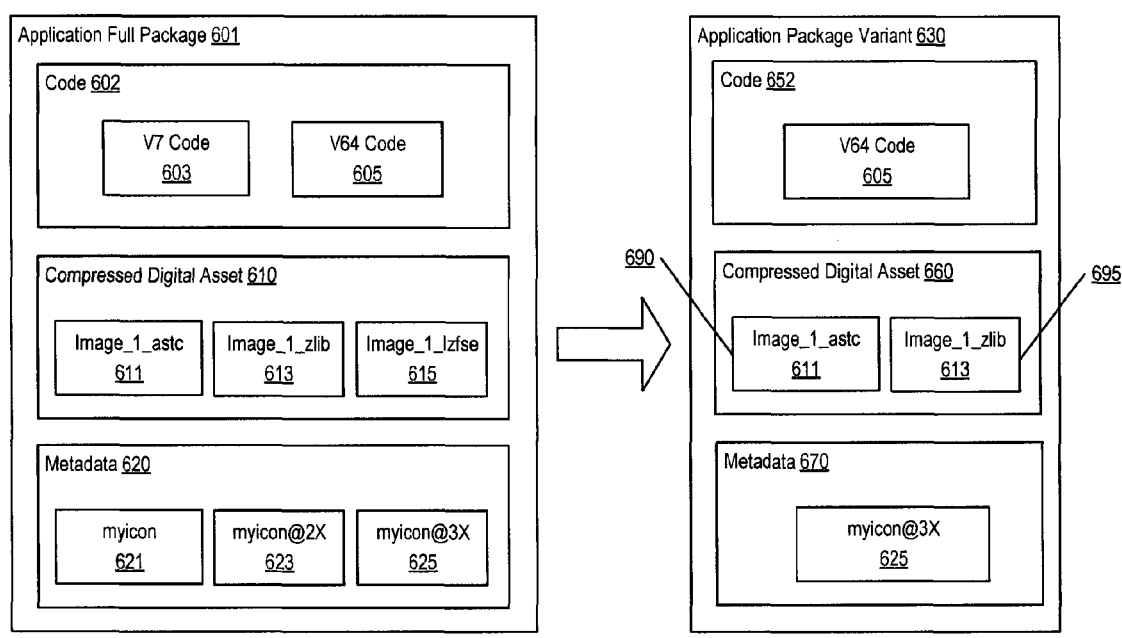
FIG. 9 is a block diagram illustrating an example application package variant with an appropriate digital asset variant and an additional alternative variant for a target device according to an embodiment of the disclosure.

FIG. 9 is a block diagram illustrating an example application package variant with an appropriate digital asset variant and an additional alternative variant for a target device according to an embodiment of the disclosure. Typically, when a compressed digital asset is included as a component for an application variant, only a single compression variant of the digital asset is required. In some embodiments, however, an additional variant may be included to provide forward compatibility features. For example, when hardware-accelerated compression is supported by hardware of a device (e.g. GPU), but not supported by software components of the device (e.g. OS, API, etc.), both a hardware-accelerated compression format and a non-hardware accelerated compression format may be included as variants. As shown in this example, the compressed digital asset 660 may include hardware-accelerated compression format 690 (e.g. Image_1_astc 611 compressed according to an ASTC compression format) and a non-hardware accelerated compression format 695 (e.g. Image_1_zlib 613 compressed according to a zlib compression format).

It should be noted that multiple variants may be provided in an efficient manner, and in some embodiments, only under particular circumstances. For example, the aim of application "thinning" is typically aimed at minimizing the size of installation packages, and accordingly, does not merely include additional variants in a "catch-all" manner. For example, in one embodiment, both hardware-accelerated and non-hardware-accelerated compression formats are included only when hardware of the device supports such compression. For instance, in certain suites of devices, hardware components (e.g. GPU) are not typically upgraded within a device, and instead, a user will upgrade the entire device (e.g. a newer version of the device). Accordingly, in an embodiment, both compression formats are included only in instances where future compatibility may be obtainable via a software update.

Figure 10:
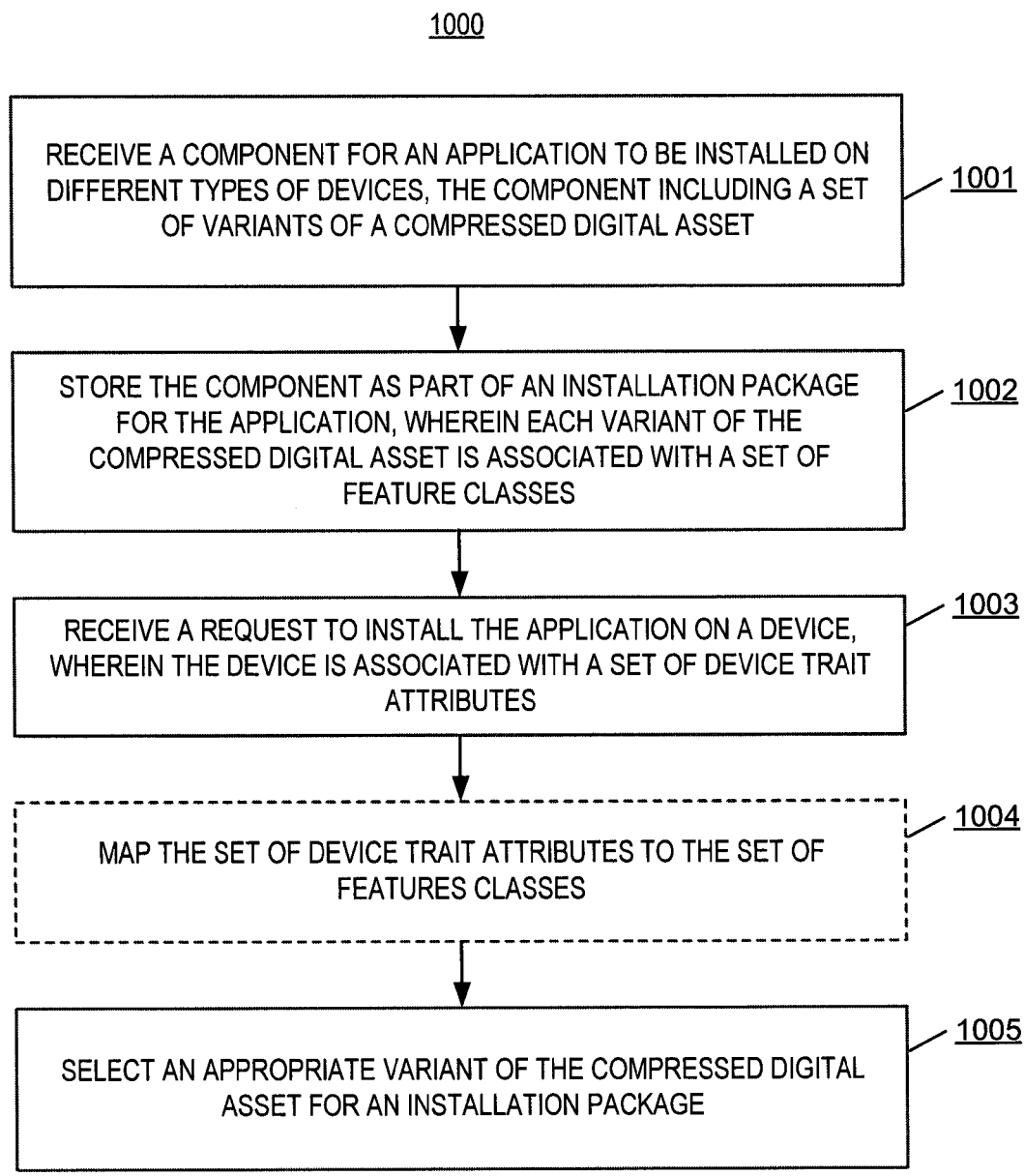
FIG. 10 is a flow diagram illustrating a method of selecting an appropriate digital asset variant when creating an installation package according to an embodiment of the disclosure.

FIG. 10 is an example flow diagram illustrating a method of selecting an appropriate digital asset variant when creating an installation package according to an embodiment of the disclosure. Process 1000 may use processing logic which may include software, hardware, or a combination thereof. For example, process 1000 may be performed by a server (e.g. application distribution server 150), or a computing device or device. In block 1001, the server receives a component for an application to be installed on a set of different types of devices. The component may include a set of variants of a compressed digital asset, wherein each variant of the compressed digital asset is compressed with a different one of a set of compression formats.

In block 1002, the server stores the component as part of an installation package for the application. The server may store the components in a data store and the data may also be indexed. For example, each variant of the compressed digital asset may be associated with a set of feature classes including at least a graphics processing class.

In block 1003, the server receives a first request to install the application on a first device and the first device may be associated with a first set of device trait attributes characterizing the first device. For example, the first set of device trait attributes may include at least a graphics processing unit attribute.

In one embodiment, the server may also perform a mapping. For example, in block 1004, the server may map the first set of device trait attributes to the set of feature classes. The mapping may include mapping at least the graphics processing unit attribute of the first device to the graphics processing class. In an embodiment, the server may also determine the graphics processing unit attribute of the first device does not have a corresponding graphics processing class, and in response, select a variant associated with a default graphics processing class as the appropriate variant of the compressed digital asset. For example, the default graphics processing class may correspond to a non-hardware-accelerated compression format.

In some embodiments, the set of feature classes may further include an operating system class, and the first set of device trait attributes may further include an installed operating system version attribute. Accordingly, in one embodiment, the server may also map the installed operating system version attribute to the operating system class, and select the appropriate variant of the compressed digital asset based on the mapped graphics processing class and the mapped operating system class. In another embodiment, the server may also map the installed operating system version attribute to the operating system class. The server may determine the mapped operating system class of the first device does not support the mapped graphics processing class of the first device, and in response, select, as part of the installation package, an additional variant of the compressed digital asset.

It is often the case that an operating system is provided with a device, and accordingly, an operating system typically supports most of the hardware capabilities of the device. There are instances, however, when a hardware capability outpaces a software component of the device. For example, when a component is upgraded, or when a user delays upgrading an operating system. Accordingly, there may be instances when a device is provided with hardware in anticipation of future support. Accordingly, in such case, a feature class (or other indicator) may account for such a scenario while still thinning down application packages for installation. In such a situation, the appropriate variant may be stored on a device to be renderable during execution of the application once an operating system of the first device is updated (or upgraded). For example, an image compressed using a hardware-accelerated compression format (e.g. ASTC) may reside on a device and not available (e.g. not renderable) until the operating system (or relevant API) is updated. Once the operating system (or API) is updated (e.g. to support a hardware-accelerated compress format), the application may now use the hardware-accelerated compression format stored on the device instead of the previous version (or variant).

In block 1005, the server may select, as part of the installation package for the first device, at least an appropriate variant of the compressed digital asset based on the mapped graphics processing class.

Figure 11:
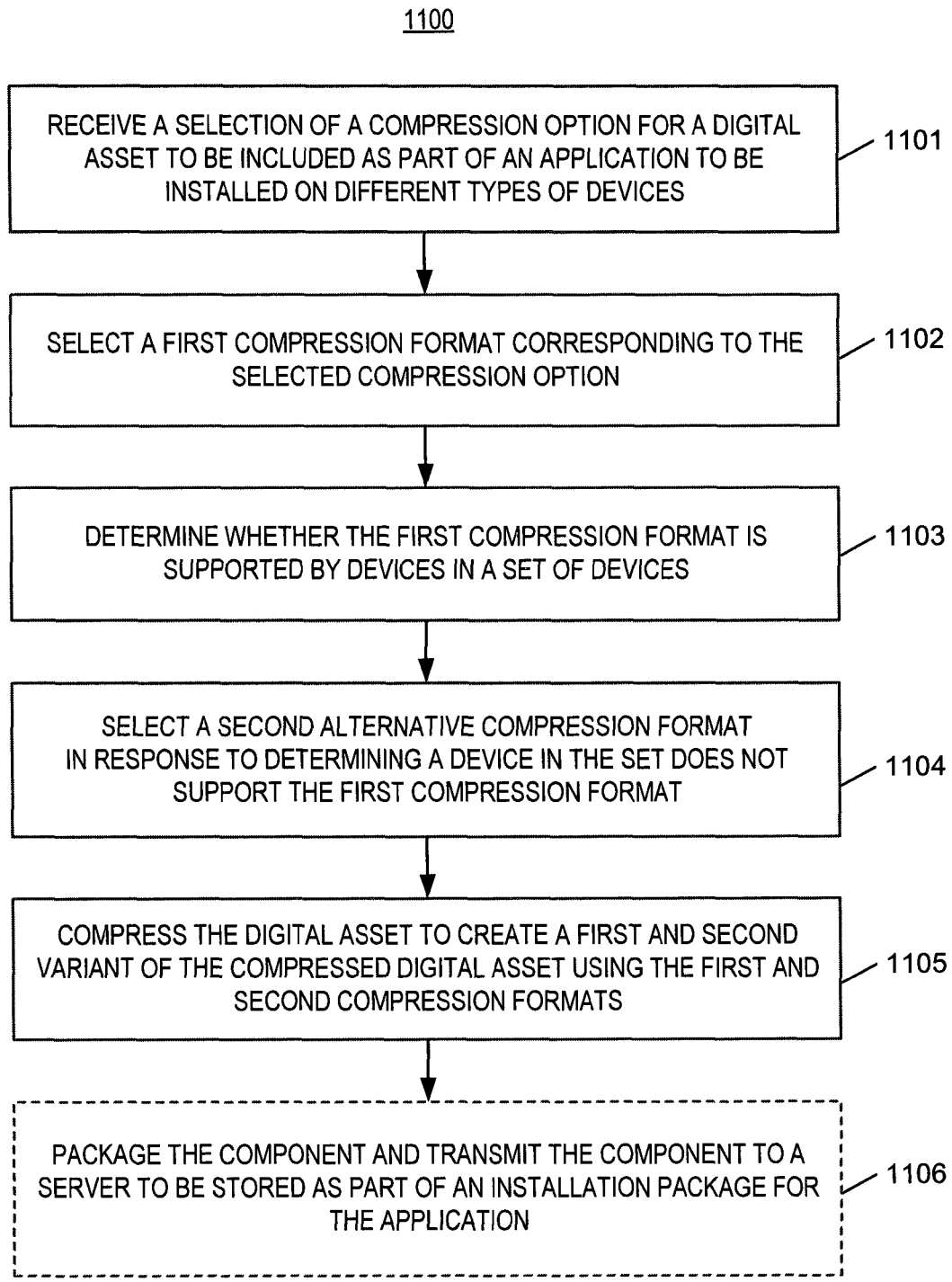
FIG. 11 is a flow diagram illustrating a method of creating digital asset variants according to an embodiment of the disclosure.

FIG. 11 is an example flow diagram illustrating a method of creating digital asset variants according to an embodiment of the disclosure. Process 1100 may use processing logic which may include software, hardware, or a combination thereof. For example, process 1100 may be performed by a device that performs compiling or compression. Typically, process 1100 may be performed within a development environment (e.g. on development device 110), but other devices and configurations may also be used, for example, process 1100 may also be performed by, or in conjunction with, an application distribution server 150, or an intermediary device.

In block 1101, the device may receive a selection of a compression option for a digital asset to be included as part of an application to be installed on a set of different types of devices. For example, receiving the selection may be in response to a user selecting one or more options from an interface. The differently types of device may also be selected based on a selection from a user and may include, for example, at least a first type of device and a second type of device.

In block 1102, the device selects a first compression format corresponding to the selected compression option, and in 1103, the device determines whether the first compression format is supported by at least one device in the set of different types of devices. Accordingly, the device may determine at least the first type of device supports the first compression format by determining a first device trait attribute associated with the first type of device supports the first compression format. For example, the first device trait attribute may indicate a graphics processing unit of the first type of device supports hardware-accelerated decompression. In an embodiment, determining the first device trait attribute associated with the first type of device supports the first compression format may include determining the first device trait attribute supports a feature class associated with the first compression format.

In block 1104, the device may also determine at least the second type of device does not support the first compression format by determining a second device trait attribute associated with the second type of device does not support the first compression format, and in response, select a second, alternative, compression format. For example, the second device trait attribute may indicate a graphics processing unit of the second type of device does not support hardware-accelerated decompression. In another example, the second device trait attribute may indicate an installed operating system version or an installed application programming interface (API) version of the second type of device does not support hardware-accelerated decompression.

In an embodiment, determining at least the second type of device does not support the first compression format further may include determining a third device trait attribute associated with the second type of device. For example, the second device trait attribute may indicate a graphics processing unit of the second type of device does in fact support the first compression format, but the third device trait attribute may indicate an installed operating system version or an installed application programming interface (API) version of the second type of device does not support the first compression format. Accordingly, in such a scenario, although a graphics processing unit of the second type of device supports a particular compression format, an alternative compression format may also be included (e.g. as a fallback) to be used until the relevant software component is upgraded.

In block 1105, the device may compress the digital asset to create a first and second variant of the compressed digital asset to be included as part of an installation package for the application. For example, the first compression format may be a hardware-accelerated compression format and the second compression format may be a non-hardware-accelerated compression format.

In an embodiment, the device may also package the component and transmit the component to a server to be stored as part of an installation package for the application, as shown in block 906. For example, a development device may package the component and transmit the package to an application distribution server to be downloaded to a target device.

Accordingly, the methods described herein may provide an efficient mechanism for accounting for the differences between capabilities of a set of target devices by providing a variant of a digital asset based on specific device capabilities.

It should be noted that there may be variations to the flow diagrams or the steps (or operations) described therein without departing from the embodiments described herein. For instance, the steps may be performed in parallel, simultaneously, a differing order, or steps may be added, deleted, or modified.

Figure 12:
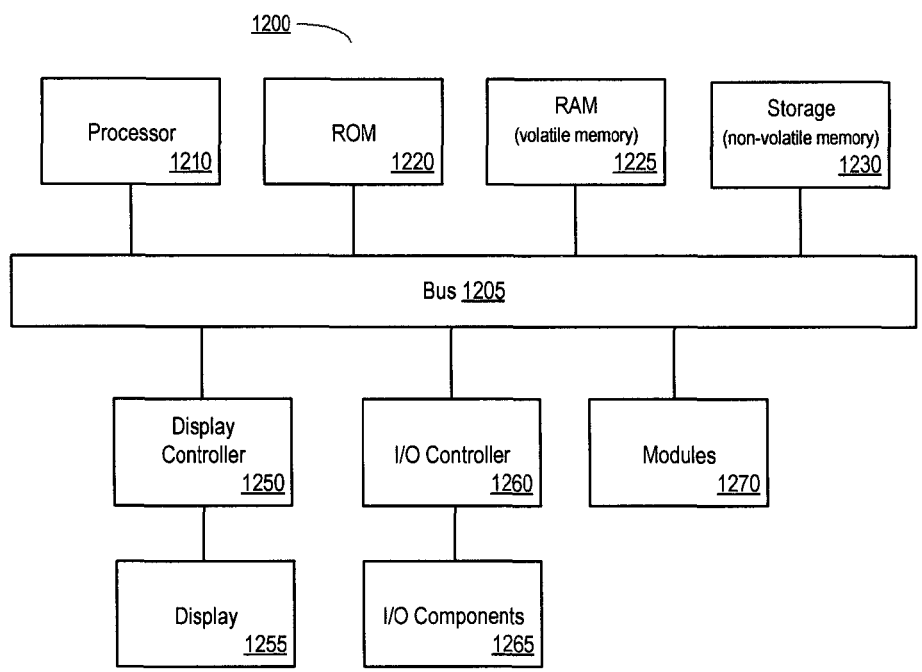
FIG. 12 is a block diagram illustrating an example computing system which may be used in conjunction with one or more of the embodiments of the disclosure.

FIG. 12 is a block diagram illustrating an example computing system which may be used in conjunction with one or more of the embodiments of the disclosure. For example, computing system 1200 (or system, or computing device, or device) may represent any of the systems (e.g. systems 200 and 300), or devices described herein (e.g. development device 110 or application distribution server 150) that perform any of the processes, operations, or methods of the disclosure. Note that while the computing system illustrates various components, it is not intended to represent any particular architecture or manner of interconnecting the components as such details are not germane to the present disclosure. It will also be appreciated that other types of systems that have fewer or more components than shown may also be used with the present disclosure.

As shown, the computing system 1200 may include a bus 1205 which may be coupled to a processor 1210, ROM (Read Only Memory) 1220, RAM (or volatile memory) 1225, and storage (or non-volatile memory) 1230. The processor 1210 may retrieve stored instructions from one or more of the memories 1220, 1225, and 1230 and execute the instructions to perform processes, operations, or methods described herein. These memories represent examples of a non-transitory machine-readable medium or storage containing instructions which when executed by a computing system (or a processor), cause the computing system (or processor) to perform operations, processes, or methods described herein. The RAM 1225 may be implemented as, for example, dynamic RAM (DRAM), or other types of memory that require power continually in order to refresh or maintain the data in the memory. Storage 1230 may include, for example, magnetic, semiconductor, tape, optical, removable, non-removable, and other types of storage that maintain data even after power is removed from the system. It should be appreciated that storage 1230 may be remote from the system (e.g. accessible via a network).

A display controller 1250 may be coupled to the bus 1205 in order to receive display data to be displayed on a display device 1255, which can display any one of the user interface features or embodiments described herein and may be a local or a remote display device. The computing system 1200 may also include one or more input/output (I/O) components 1265 including mice, keyboards, touch screen, network interfaces, printers, speakers, and other devices. Typically, the input/output components 1265 are coupled to the system through an input/output controller 1260.

Modules 1270 (or components, units, or logic) may represent any of the modules described above, such as, for example, application development module 203, compiler/compression module 230, and installation package creation module 310 (and related modules, and sub-modules). Modules 1270 may reside, completely or at least partially, within the memories described above, or within a processor during execution thereof by the computing system. In addition, modules 1270 can be implemented as software, firmware, or functional circuitry within the computing system, or as combinations thereof.

In the foregoing specification, example embodiments of the disclosure have been described. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A non-transitory machine-readable medium storing instructions which, when executed by one or more processors of a computing device, cause the computing device to perform operations comprising:
   receiving a component for an application to be installed on a set of different types of devices, the component including a set of variants of a compressed digital asset, wherein each variant of the compressed digital asset is compressed with a different one of a set of compression formats and associated with a set of feature classes including at least a graphics processing class;
   storing the component as part of an installation package for the application;
   receiving a first request to install the application on a first device, wherein the first device is associated with a first set of device trait attributes characterizing the first device, the first set of device trait attributes including at least a graphics processing unit attribute;
   mapping the first set of device trait attributes to the set of feature classes including mapping at least the graphics processing unit attribute of the first device to the graphics processing class; and
   selecting, as part of the installation package for the first device, at least an appropriate variant of the compressed digital asset based on the mapped graphics processing class.

2. The medium of claim 1, wherein the mapping further includes:
   determining the graphics processing unit attribute of the first device does not correspond to a first graphics processing class; and
   in response to determining the graphics processing unit attribute does not correspond to a first graphics processing class, selecting a variant associated with a default graphics processing class as the appropriate variant of the compressed digital asset.

3. The medium of claim 2, wherein the first graphics processing class corresponds to a graphics processing class that indicates support for hardware-accelerated decompression.

4. The medium of claim 1, wherein the set of feature classes further includes an operating system class, and the first set of device trait attributes further includes an installed operating system version attribute, and wherein
   the mapping further includes mapping the installed operating system version attribute to the operating system class, and
   the selecting selects the appropriate variant of the compressed digital asset based on the mapped graphics processing class and the mapped operating system class.

5. The medium of claim 1, wherein the set of feature classes further includes a software component class, and the first set of device trait attributes further includes an installed software component version attribute, and wherein
   the mapping further includes mapping the installed software component version attribute to the software component class, and determining the mapped software component class of the first device does not support the mapped graphics processing class of the first device; and
   in response to determining the mapped software component class does not support the mapped graphics processing class, the selecting selects, for the component, an additional variant of the compressed digital asset supported by the software component class.

6. The medium of claim 5, wherein the appropriate variant is compressed with a hardware-accelerated compression format, and the additional variant is compressed with a non-hardware-accelerated compression format.

7. The medium of claim 6, wherein the software component class is an operating system class and the installed software component version attribute is an installed operating system version attribute.

8. The medium of claim 7, wherein the appropriate variant is to be stored on the first device and renderable during execution of the application once an operating system of the first device is updated.

9. The medium of claim 8, wherein the appropriate variant is compressed with advanced scalable texture compression (ASTC) as the hardware-accelerated compression format.

10. A non-transitory machine-readable medium storing instructions which, when executed by one or more processors of a computing device, cause the computing device to perform operations comprising:
receiving a selection of a compression option, from amongst a set of compression options, for a digital asset to be included as part of an application to be installed on a set of different types of devices including at least a first and second type of device;
selecting a first compression format corresponding to the selected compression option;
determining whether the first compression format is supported by each type of device in the set of different types of devices, the determining including
determining at least the first type of device supports the first compression format by determining a first device trait attribute associated with the first type of device supports the first compression format, and
determining at least the second type of device does not support the first compression format by determining a second device trait attribute associated with the second type of device does not support the first compression format;
in response to determining at least the second type of device does not support the first compression format, selecting a second, alternative, compression format; and
compressing the digital asset to create a first and second variant of the compressed digital asset to be included as part of an installation package for the application, wherein the first variant is compressed using the first compression format and the second variant is compressed using the second compression format.

11. The medium of claim 10, wherein the first compression format is a hardware-accelerated compression format and the second compression format is a non-hardware-accelerated compression format.

12. The medium of claim 11, wherein the first device trait attribute indicates a graphics processing unit of the first type of device supports hardware-accelerated decompression.

13. The medium of claim 12, wherein the second device trait attribute indicates a graphics processing unit of the second type of device does not support hardware-accelerated decompression.

14. The medium of claim 12, wherein the second device trait attribute indicates an installed operating system version or an installed application programming interface (API) version of the second type of device does not support hardware-accelerated decompression.

15. The medium of claim 11, wherein the hardware-accelerated compression format is an advanced scalable texture compression (ASTC) format.

16. The medium of claim 10, wherein the set of compression options are displayed on an interface of a development device, and each of the compression options are device agnostic.

17. The medium of claim 16, wherein the set of compression options include types of compression corresponding to at least one hardware-accelerated compression type and at least one non-hardware-accelerated compression type.

18. The medium of claim 16, wherein the set of compression options include types of compression corresponding to one or more of standard, default, highest quality, and highest compression.

19. A method comprising:
receiving, at a server, a component for an application to be installed on a set of different types of devices, the component including a set of variants of a compressed digital asset, wherein each variant of the compressed digital asset is compressed with a different one of a set of compression formats;
storing, by the server in a storage, the component as part of an installation package for the application, wherein the set of variants of the compressed digital asset includes at least a hardware-accelerated compression format variant and a non-hardware-accelerated compression format variant;
receiving, from a first device, a first request to install the application on the first device, wherein the first device is associated with a first set of device trait attributes characterizing the first device; and
selecting, as part of the installation package for the first device, at least an appropriate variant of the compressed digital asset including
selecting the hardware-accelerated compression format variant as the appropriate variant when the first set of device trait attributes indicate the first device supports hardware-accelerated decompression, and
selecting the non-hardware-accelerated compression format variant as the appropriate variant when the first set of device trait attributes indicate the first device does not support hardware-accelerated decompression.

20. The method of claim 19, wherein the hardware-accelerated compression format variant is selected as the appropriate variant when the first set of device trait attributes indicate each of a graphics processing unit, an operating system version, and an API version support hardware-accelerated decompression.

21. The method of claim 19, wherein both the hardware-accelerated compression format variant and the non-hardware-accelerated compression format variant are selected as the appropriate variant when the first set of device trait attributes include a graphics processing unit attribute indicating support for hardware-accelerated decompression, and at least one of an operating system version attribute and an API version attribute indicating non-support for hardware-accelerated decompression, and wherein the hardware-accelerated compression format variant is to be stored on the first device and renderable during execution of the application once an operating system or an API of the first device is updated.

22. A non-transitory machine-readable medium storing instructions which, when executed by one or more processors of a computing device, cause the computing device to perform operations comprising:
receiving a selection of a compression option, amongst set of compression options displayed on an interface of a computing device, for a digital asset to be included as part of an application to be installed on a set of different types of devices including at least a first device and a second device, wherein the compression options are device agnostic and include at least one option corresponding to hardware-accelerated compression format and at least one option corresponding to a non-hardware-accelerated compression format;
selecting, by the computing device, a hardware-accelerated compression format corresponding to the selected compression option;
determining at least the first device supports the hardware-accelerated compression format based on a first device trait attribute associated with the first device, wherein the first device trait attribute is a graphics processing unit attribute;

determining at least the second device does not support the hardware-accelerated compression format based on a second device trait attribute associated with the second device;

in response to determining at least the second device does not support the hardware-accelerated compression format, selecting a non-hardware-accelerated compression format; and compressing, by the computing device, the digital asset to create a first and second variant of the compressed digital asset to be included as part of an installation package for the application, wherein the first variant is compressed using the hardware-accelerated compression format and the second variant is compressed using the non-hardware-accelerated compression format.

23. The medium of claim 22, wherein the second device trait attribute indicates the second device does not include a graphics processing unit.

24. The medium of claim 22, wherein the set of compression options correspond to one or more of standard, default, highest quality, and highest compression types.

25. The medium of claim 22, wherein the set of different types of devices are determined in response to selections amongst a set of device type options displayed on the interface.

* * * * *

UNITED STATES PATENT AND TRADEMARK OFFICE
CERTIFICATE OF CORRECTION

Page 1 of 1

PATENT NO. : 9,947,069 B2
APPLICATION NO. : 15/179831
DATED : April 17, 2018
INVENTOR(S) : Patrick O. Heynen and Vince DeMarco It is certified that error appears in the above-identified patent and that said Letters Patent is hereby corrected as shown below:

In the Specification

Column 13
Line 5, delete "480" and substitute -- 490 --.

Column 17
Line 42, delete "310" and substitute -- 320 --.

Signed and Sealed this
Twenty-fourth Day of July, 2018

Andrei Iancu
*Director of the United States Patent and Trademark Office*